United States Patent
Chae

(10) Patent No.: US 12,164,557 B2
(45) Date of Patent: Dec. 10, 2024

(54) METHOD AND SYSTEM FOR BUILDING TRAINING DATABASE USING AUTOMATIC ANOMALY DETECTION AND AUTOMATIC LABELING TECHNOLOGY

(71) Applicant: AIMATICS CO., LTD, Seoul (KR)

(72) Inventor: Jeong Hun Chae, Seongnam-si (KR)

(73) Assignee: AIMATICS CO., LTD, Seoul (KR)

( * ) Notice: Subject to any disclaimer, the term of this patent is extended or adjusted under 35 U.S.C. 154(b) by 0 days.

(21) Appl. No.: 18/032,694

(22) PCT Filed: Jun. 27, 2022

(86) PCT No.: PCT/KR2022/009156
§ 371 (c)(1),
(2) Date: Apr. 19, 2023

(87) PCT Pub. No.: WO2023/287064
PCT Pub. Date: Jan. 19, 2023

(65) Prior Publication Data
US 2023/0385333 A1 Nov. 30, 2023

(30) Foreign Application Priority Data
Jul. 12, 2021 (KR) ........................ 10-2021-0090913

(51) Int. Cl.
*G06F 16/00* (2019.01)
*G06F 16/55* (2019.01)
(Continued)

(52) U.S. Cl.
CPC ............ *G06F 16/55* (2019.01); *G06F 18/285* (2023.01); *G06V 10/774* (2022.01)

(58) Field of Classification Search
CPC .................................................. G06F 18/285
See application file for complete search history.

(56) References Cited

U.S. PATENT DOCUMENTS

2020/0380145 A1* 12/2020 Van Oldenborgh ... G06V 10/70
2021/0089883 A1   3/2021 Li et al.

FOREIGN PATENT DOCUMENTS

KR       10-1879735 B1    7/2018
KR    10-2021-0048058 A   5/2021
(Continued)

OTHER PUBLICATIONS

International Search Report for PCT/KR2022/009156 mailed Sep. 23, 2022 from Korean Intellectual Property Office.
(Continued)

*Primary Examiner* — Ajith Jacob
(74) *Attorney, Agent, or Firm* — Paratus Law Group, PLLC

(57) ABSTRACT

There is provided a method for building a training database using automatic anomaly detection and automatic labeling technology. The method includes independently building a first and a second recognition model for data classification by training a labeled first training data population; generating a labeled second training data population by applying the first recognition model to an unlabeled raw data population; classifying abnormal data by applying the second recognition model to the first training data population; and updating the first training data population by refining the abnormal data in the first training data population and adding the second training data population.

8 Claims, 9 Drawing Sheets

(51) Int. Cl.
    *G06F 18/20*     (2023.01)
    *G06V 10/774*     (2022.01)

(56) References Cited

FOREIGN PATENT DOCUMENTS

| KR | 10-2021-0067442 A | 6/2021 |
| KR | 10-2337070 B1 | 12/2021 |

OTHER PUBLICATIONS

Tong Xiao et al., "Learning from massive noisy labeled data for image classification", IEEE, Jun. 2015, pp. 2691-2699.
Scott Reed et al., "Training Deep Neural Networks on Noisy Labels with Bootstrapping", arXiv:1412.6596v1, Dec. 2014, pp. 1-11.

\* cited by examiner

METHOD AND SYSTEM FOR BUILDING TRAINING DATABASE USING AUTOMATIC ANOMALY DETECTION AND AUTOMATIC LABELING TECHNOLOGY

CROSS-REFERENCE TO PRIOR APPLICATIONS

This application is a National Stage Patent Application of PCT International Patent Application No. PCT/KR2022/009156 (filed on Jun. 27, 2022) under 35 U.S.C. § 371, which claims priority to Korean Patent Application No. 10-2021-0090913 (filed on Jul. 12, 2021), which are all hereby incorporated by reference in their entirety.

BACKGROUND

The present disclosure relates to a technology for generating training data for machine learning, and more particularly, to a method and system for building training database which minimizes time and human resources required in the process of generating correct answer data.

Training methods of machine learning are largely classified into three methods: supervised training, unsupervised training, and reinforcement training. The supervised training is a training method in which correct answer data (a pair of input data and labels corresponding thereto) already exist, and the correct answer is informed to a training model so that the error between a predicted value of the training model and the correct value is minimized. The unsupervised training is a training method in which no correct answer data exist (only input data exist), and the data are classified by analyzing similarities among the data and hidden characteristics. The reinforcement training is a training method through a process of assigning rewards and punishments to model decisions in the environment without correct answer data.

The supervised training has the advantage that it is stable and easy to learn and evaluate performance, compared to the unsupervised training or the reinforcement training, since clear correct answer data already exists. However, it takes a lot of time and human resources to the extent that the process of preparing training data occupies most of the supervised training. In addition, since the quantity and quality of training data has a great influence on the recognition performance of the trained machine learning model, it can be said that the key point in the supervised training is the generation of training data.

Meanwhile, the following problems exist in the generation of training data.

First, it takes a lot of resources to manually generate a large amount of correct answer data. Since the amount of correct answer data used for training has a great influence on the recognition performance of the trained model, the amount of data needs to be continuously increased to improve the recognition performance. When the amount of data is small, even a small increase in data greatly improves recognition performance, but when the amount of data increases, more data is required to improve recognition performance at the same level, and more resources are continuously required for this.

Second, as the volume of data increases, it is difficult to balance the data. In the correct data, an imbalance in the quantity among classes is caused depending on the frequency of observation in the real world. This greatly affects the inter-class recognition performance of the training model. For example, since a model trained using a face dataset in which the majority of the dataset are white faces has a bias that white faces are distinguished well, but black/Asian faces are not distinguish well, a problem of unintentional racial discrimination may arise.

Thirdly, it is difficult to check the correct answer data. There are a small number of incorrectly labeled correct answer data in the correct answer data once created, but it is difficult to find them easily. Although there is a small number of mislabeled correct answer data, additional resources may be required for the check since all data need to be checked to proceed with the check. The mislabeled correct answer data may adversely affect the performance of the trained model by reducing the quality of the training data.

PRIOR ART DOCUMENT

[Patent Document]
Korean Patent Registration No. 10-1879735 (2018.07.12)

SUMMARY

One embodiment of the present disclosure relates to a system and method for building a training database that minimizes time and human resources required in a process of generating correct answer data.

One embodiment of the present disclosure provides a data building system that continuously increases training data by automatically classifying abnormal data in labeled training data using a machine learning model, automatically applying labeling to raw data using a machine learning model, and repeating these.

A method for building a training database using automatic anomaly detection and automatic labeling technology, among embodiments of the present disclosure, includes: independently building a first and a second recognition model for data classification by training a labeled first training data population; generating a labeled second training data population by applying the first recognition model to an unlabeled raw data population; classifying abnormal data by applying the second recognition model to the first training data population; and updating the first training data population by refining the abnormal data in the first training data population and adding the second training data population.

The building of the recognition model may include building the first recognition model and the second recognition model as one recognition model.

The generating of the second training data population may include sampling and updating imbalanced data in the second training data population based on data distribution of the first training data population.

The generating of the second training data population may include classifying abnormal data and updating labels of the abnormal data by applying the second recognition model to the second training data population.

The classifying of the abnormal data may include determining the abnormal data based on loss of the recognition model.

The updating of the first training data population may include removing the abnormal data from the first training data population or updating a label of the abnormal data.

The training database building method may further include increasing training data by repeatedly performing the building of the recognition model, the generation of the second training data population, and the updating of the first training data population.

A system for building a training database using automatic anomaly detection and automatic labeling technology, among embodiments of the present disclosure, includes: a recognition model building unit that independently builds a first and a second recognition model for data classification by training a labeled first training data population; an auto-labeling unit that generates a labeled second training data population by applying the first recognition model to an unlabeled raw data population; a data classifying unit that classifies abnormal data by applying the second recognition model to the first training data population; and a data updating unit that updates the first training data population by refining the abnormal data in the first training data population and adding the second training data population.

The disclosed technology may have the following effects. However, it does not mean that a specific embodiment should include all of the following effects or only the following effects, so it should not be understood that the scope of the disclosed technology is limited by the following effects.

The method and system for building a training database using automatic anomaly detection and automatic labeling technology according to one embodiment of the present disclosure can continuously increase training data by automatically classifying abnormal data in labeled training data using a machine learning model, automatically applying labeling to raw data using a machine learning model, and repeating these.

A method and system for building a training database using automatic anomaly detection and automatic labeling technology according to one embodiment of the present disclosure can apply both automatic classification and automatic labeling of abnormal data as one machine learning model, and can extract meaningful labeled data from auto-labeled data based on the existing training data distribution.

DETAILED DESCRIPTION

Figure 1:
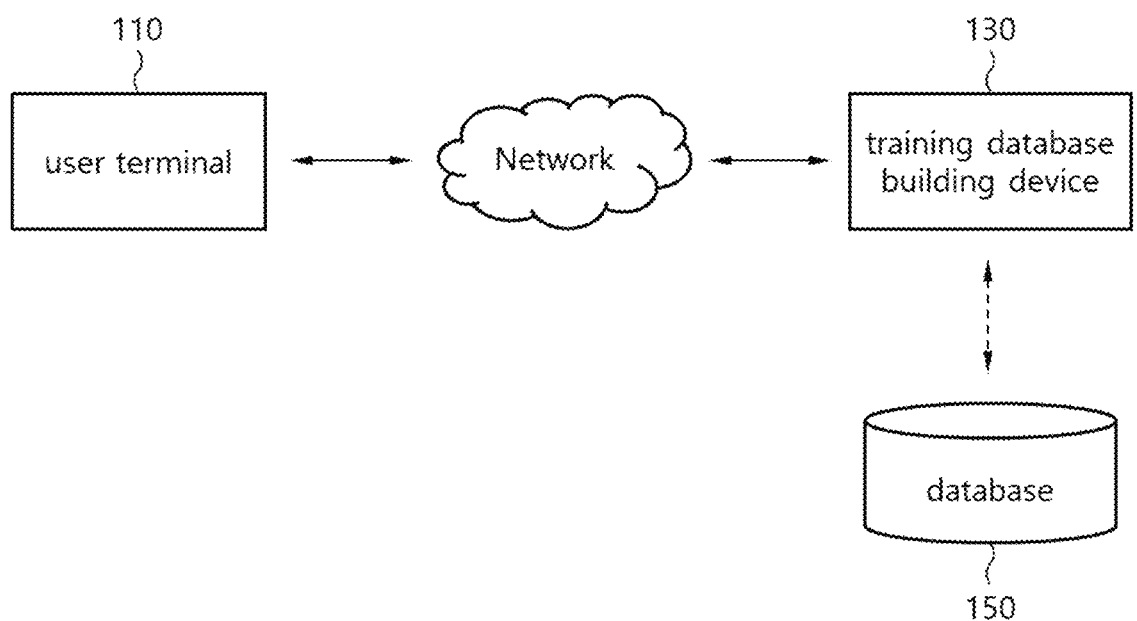
FIG. 1 is a diagram illustrating a training database building system according to the present disclosure.

Since the description of the present disclosure is merely an embodiment for structural or functional explanation, the scope of the present disclosure should not be construed as being limited by the embodiments described in the text. That is, since the embodiments may be variously modified and may have various forms, the scope of the present disclosure should be construed as including equivalents capable of realizing the technical idea. In addition, a specific embodiment is not construed as including all the objects or effects presented in the present disclosure or only the effects, and therefore the scope of the present disclosure should not be understood as being limited thereto.

On the other hand, the meaning of the terms described in the present application should be understood as follows.

Terms such as "first" and "second" are intended to distinguish one component from another component, and the scope of the present disclosure should not be limited by these terms. For example, a first component may be named a second component and the second component may also be similarly named the first component.

It is to be understood that when one element is referred to as being "connected to" another element, it may be connected directly to or coupled directly to another element or be connected to another element, having the other element intervening therebetween. On the other hand, it is to be understood that when one element is referred to as being "connected directly to" another element, it may be connected to or coupled to another element without the other element intervening therebetween. Meanwhile, other expressions describing a relationship between components, that is, "between," "directly between," "neighboring to," "directly neighboring to," and the like, should be similarly interpreted.

It should be understood that the singular expression includes the plural expression unless the context clearly indicates otherwise, and it will be further understood that the terms "comprises" or "have" used in this specification, specify the presence of stated features, numerals, steps, operations, components, parts, or a combination thereof, but do not preclude the presence or addition of one or more other features, numerals, steps, operations, components, parts, or a combination thereof.

Identification symbols (for example, a, b, and c) for individual steps are used for the convenience of description. The identification symbols are not intended to describe an operation order of the steps. Therefore, unless otherwise explicitly indicated in the context of the description, the steps may be executed differently from the stated order. In other words, the respective steps may be performed in the same order as stated in the description, actually performed simultaneously, or performed in reverse order.

The present disclosure may be implemented in the form of program code in a computer-readable recording medium. A computer-readable recording medium includes all kinds of recording devices storing data that a computer system may read. Examples of a computer-readable recording medium include a ROM, a RAM, a CD-ROM, a magnetic tape, a floppy disk, and an optical data storage device. Also, the computer-readable recording medium may be distributed over computer systems connected through a network so that computer-readable code may be stored and executed in a distributed manner.

Unless defined otherwise, all the terms used in the present disclosure provide the same meaning as understood generally by those skilled in the art to which the present disclosure belongs. Those terms defined in ordinary dictionaries should be interpreted to have the same meaning as conveyed in the context of related technology. Unless otherwise defined explicitly in the present disclosure, those terms should not be interpreted to have ideal or excessively formal meaning.

FIG. 1 is a diagram illustrating a training database building system according to the present disclosure.

Referring to FIG. 1, a training database building system 100 may be implemented to include a user terminal 110, a training database building device 130, and a database 150.

The user terminal 110 may correspond to a terminal device operated by a user. In one embodiment of the present disclosure, a user may be understood as one or more users, and a plurality of users may be divided into one or more user groups. Each of one or more users may correspond to one or more user terminals 110. That is, a first user may correspond to a first user terminal, a second user may correspond to a second user terminal, . . . , the n-th user (where n is a natural number) may correspond to the n-th user terminal.

In addition, the user terminal 110, as one device constituting the training database building system 100, may correspond to a computing device capable of performing user's actions including creating, modifying, and deleting training data. For example, the user terminal 110 may be implemented as a smartphone, laptop, or computer that is connected to and operable with the training database building device 130, and may be implemented as various devices including a tablet PC and the like without being limited to the above.

In addition, the user terminal 110 may install and execute a dedicated program or application for interworking with the training database building device 130. For example, the user terminal 110 may output an image provided by the training database building device 130 to generate training data, and deliver label information input by the user to the training database building device 130. This process may be performed through an interface provided through the dedicated program or application.

Meanwhile, the user terminal 110 may be connected to the training database building device 130 through a network, and a plurality of user terminals 110 may be simultaneously connected to the training database building device 130.

The training database building device 130 may be implemented as a server corresponding to a computer or program that performs a training database building method according to the present disclosure. In addition, the training database building device 130 may be connected to the user terminal 110 through a wired network or a wireless network such as Bluetooth, WiFi, LTE, and the like, and may transmit and receive data to and from the user terminal 110 through the network.

In addition, the training database building device 130 may be implemented to operate in connection with an independent external system (not shown in FIG. 1) to collect training data or provide training data. In one embodiment, the training database building device 130 may be implemented as a cloud server, and may satisfy various needs of users regarding building and utilization of a training database through a cloud service.

The database 150 may correspond to a storage device which stores various information necessary for the operation of the training database building device 130. For example, the database 150 may store a population of training data collected from various sources or store information about a training algorithm for building a machine learning model and the training model. However, without being limited to the above, the database 150 may store collected or processed information in various forms in the process where the training database building device 130 performs the training database building method using automatic anomaly detection and automatic labeling technology according to the present disclosure.

In addition, although the database 150 is shown in FIG. 1 as a device independent of the training database building device 130, the database 150 may be included in the training database building device 130 as a logical storage device without being limited thereto.

Figure 2:
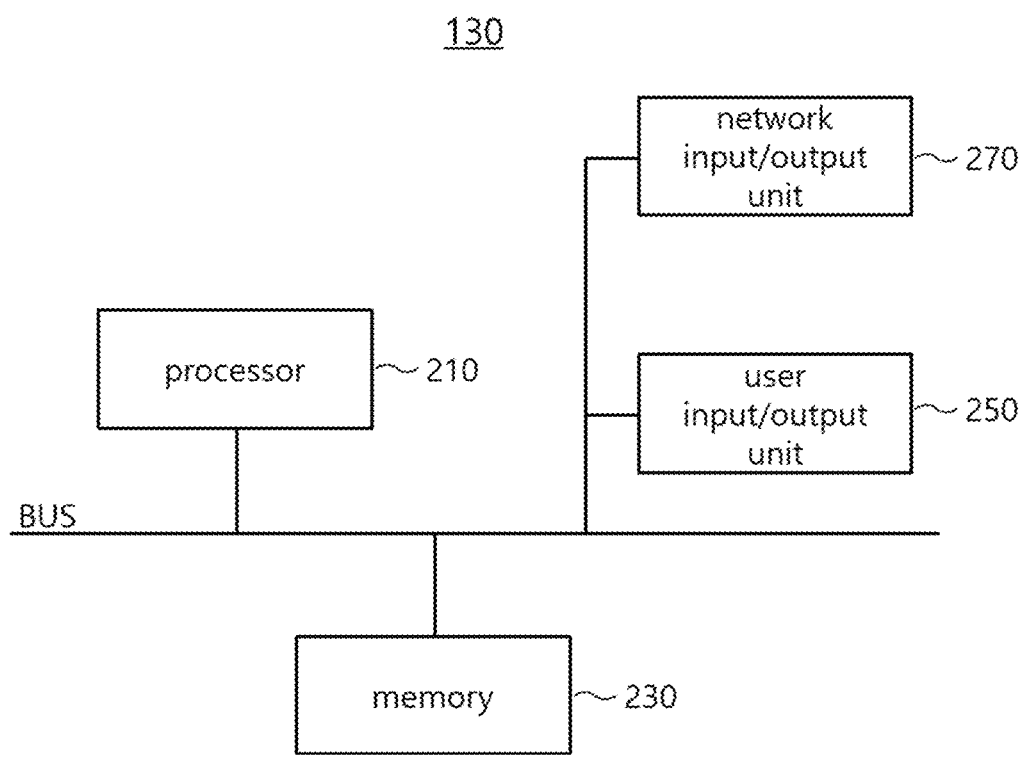
FIG. 2 is a diagram illustrating the system configuration of a training database building device of FIG. 1.

FIG. 2 is a diagram illustrating the system configuration of the training database building device of FIG. 1.

Referring to FIG. 2, the training database building device 130 may include a processor 210, a memory 230, a user input/output unit 250, and a network input/output unit 270.

The processor 210 may execute a training database building procedure according to one embodiment of the present disclosure, and may manage the memory 230 read or written in this process, and schedule a synchronization time between volatile and non-volatile memory in memory 230. The processor 210 may control the overall operation of the training database building device 130, and may be electrically connected to the memory 230, the user input/output unit 250, and the network input/output unit 270 to control data flow between them. The processor 210 may be implemented as a central processing unit (CPU) of the training database building device 130.

The memory 230 may be implemented as a non-volatile memory such as a solid state disk (SSD) or a hard disk drive (HDD) and include an auxiliary storage device used to store all data necessary for the training database building device 130, and may include a main storage device implemented as a volatile memory such as random access memory (RAM). In addition, the memory 230 may store a set of instructions for executing the training database building method according to the present disclosure by being executed by the electrically connected processor 210.

The user input/output unit 250 includes an environment for receiving user input and an environment for outputting specific information to the user. For example, the user input/output unit 250 may include an input device including an adapter such as a touch pad, a touch screen, an on-screen keyboard, or a pointing device, and an output device including an adapter such as a monitor or touch screen. In one embodiment, the user input/output unit 250 may correspond to a computing device connected through a remote connection, and in such a case, the training database building device 130 may be implemented as an independent server.

The network input/output unit 270 provides a communication environment for connection with the user terminal 110 through a network. For example, the network input/output unit 270 may include adapters for communication such as a local area network (LAN), a metropolitan area network (MAN), a wide area network (WAN), and a value added network (VAN). In addition, for wireless transmission of training data, the network input/output unit 270 may be implemented to provide a short-range communication function such as WiFi or Bluetooth, or a 4G or higher wireless communication function.

Figure 3:
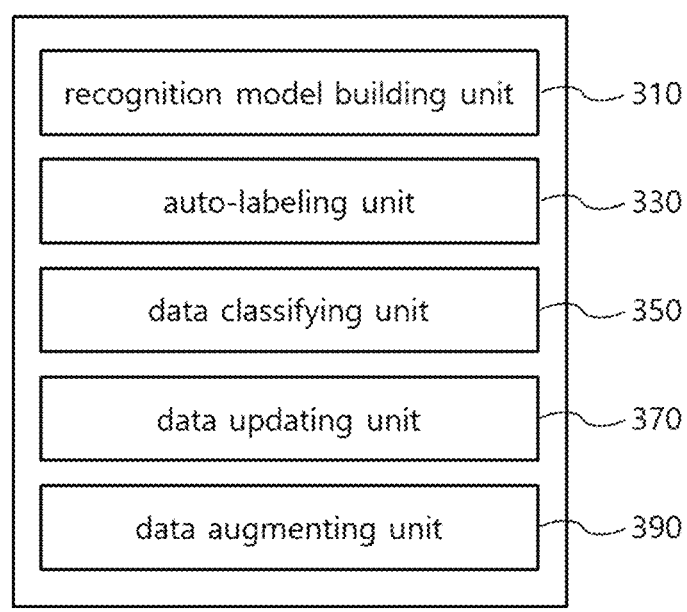
FIG. 3 is a diagram illustrating the functional configuration of the training database building device of FIG. 1.

FIG. 3 is a diagram illustrating the functional configuration of the training database building device of FIG. 1.

Referring to FIG. 3, the training database building device 130 may include a recognition model building unit 310, an auto-labeling unit 330, a data classifying unit 350, a data updating unit 370, a data augmenting unit 390, and a control unit (not shown in FIG. 3).

The recognition model building unit 310 may independently construct a first and a second recognition model for data classification by training a labeled first training data population. In this case, the recognition model may correspond to a training model constructed through a machine learning algorithm including deep learning or a deep neural network. In addition, the first training data population is a set of previously collected data, and each training data may be labeled data, that is, data to which label information is assigned. The first recognition model and the second recognition model may be independently constructed by the recognition model building unit 310, and the recognition model building unit 310 may apply different training data to the training process of each of the first and second recognition models.

For example, the recognition model building unit 310 may construct the first recognition model by training a part of the first training data population, and construct the second recognition model by training the rest of the first training data population. In addition, the recognition model building unit 310 may construct the first and second recognition models by sequentially training data randomly selected from the first training data population.

Meanwhile, the recognition model building unit 310 may divide the first training data population into training data and test data at a predetermined ratio. In the process of building the recognition model with the training data, the recognition model building unit 310 may repeatedly perform the training process until the accuracy measured with the test data meets a predetermined criterion. Then, the trained recognition models may be stored and managed in the database 150 linked with the training database building device 130.

In one embodiment, the recognition model building unit 310 may build the first recognition model and the second recognition model as one recognition model. The recognition model building unit 310 may basically classify and build each of the first and second recognition models according to the conditions and purpose of use of the recognition model, but build only one recognition model as needed regardless of the purpose of use. That is, when only one recognition model is generated by the recognition model building unit 310, the same recognition model may be integrally applied whenever model inference is required.

The auto-labeling unit 330 may generate a labeled second training data population by applying the first recognition model to an unlabeled raw data population. In this case, the raw data population may be a data set collected independently of the first training data population which is the existing training data, and may correspond to a set of unlabeled training data to which label information is not assigned. Accordingly, an operation performed by the auto-labeling unit 330 may correspond to an auto-labeling operation of automatically assigning label information to unlabeled data.

That is, the first recognition model implemented as a machine learning model may receive unlabeled material as an input and generate label information as an output as a result of a propagation operation that proceeds through a predetermined network step. As a result, the second training data population generated by the auto-labeling unit 330 may correspond to a set of auto-labeled training data generated by applying automatic labeling to new raw data. In addition, misrecognized or unrecognized error data may exist in a predetermined ratio in the second training data population generated through the auto-labeling operation.

In one embodiment, the auto-labeling unit 330 may sample and update imbalanced data in the second training data population based on data distribution of the first training data population. In this case, the imbalanced data may correspond to data in a case where the data in a specific data population are not evenly distributed within a predetermined ratio. That is, the imbalanced data may correspond to data distributed at a very high ratio or data distributed at a very low ratio compared to other data within the data population.

For example, when in a data population composed of A, B, and C types of data, the respective types of data are distributed at a ratio of 40%:45%:15%, type C data is distributed at a much lower ratio than type A and B data, so type C data may correspond to unbalanced data. Conversely, when the respective types of data are distributed at a ratio of 65%:20%:15%, type A data is distributed at a much higher ratio than type B and C data, so type A data may correspond to unbalanced data.

More specifically, when type A data corresponds to imbalanced data with a low distribution ratio within the first training data population, the auto-labeling unit 330 may select type A data at a higher rate in the process of selecting data from the second training data population through sampling. Conversely, when type C data in the first training data population corresponds to imbalanced data with a high distribution ratio, the auto-labeling unit 330 may select type C data at a lower rate from the second training data population. That is, the second training data population may be updated by replacing existing data with data selected through sampling. After being updated, in the second training data population, type A data may be distributed at a relatively higher ratio than the other types of data, and type C data may be distributed at a relatively lower ratio than the other types of data.

In addition, the second training data population may be integrated with the first training data population through subsequent operation steps, and as a result of adjusting the data distribution through the auto-labeling unit 330, the data distribution may be balanced within the integrated training data population.

In one embodiment, the auto-labeling unit 330 may apply the second recognition model to the second training data population to classify abnormal data and update labels of the abnormal data. The auto-labeling unit 330 may classify misrecognized or unrecognized error data included in the second training data population as abnormal data, and perform a relabeling operation on the abnormal data to remove the abnormal data within the second training data population. Meanwhile, operations of classifying abnormal data and updating labels performed by the auto-labeling unit 330 may be implemented corresponding to operations of the data classifying unit 350 and the data updating unit 370, which will be described below, respectively.

The data classifying unit 350 may classify abnormal data by applying the second recognition model to the first training data population. In this case, the second recognition model may be used to classify normal data and abnormal data in the process of performing an operation of inferring a label by receiving labeled data as an input. The data classifying unit 350 may perform an operation of selecting abnormal data which degrades the quality of the training data from the first training data population.

More specifically, the data classifying unit 350 may extract a loss function value of individual data by applying the second recognition model, which is a machine learning model, to existing training data. In this case, the loss function may correspond to a function that quantifies a difference between an actual value and a predicted value. The larger the difference between the actual value and the predicted value, the larger the loss function value is, whereas the smaller the difference, the smaller the loss function value is. In the case of the machine learning model, training may proceed in a direction of minimizing the loss function value. The loss function may include mean squared error (MSE), cross-entropy, and the like.

Accordingly, the data classifying unit 350 may extract data having a loss function value greater than or equal to a predetermined reference value to determine the data as an abnormal data candidate, and may determine data having a loss function value less than the reference value as a normal data candidate. When the data is classified as the abnormal data candidate by the data classifying unit 350, it may be corrected to normal data through a data refinement step and then added to the first training data population.

In one embodiment, the data classifying unit 350 may determine abnormal data based on a loss of the recognition model. The data classifying unit 350 may select abnormal data from the training data population through various methods using the recognition model. For example, the data classifying unit 350 may determine abnormal data based on the variability of loss in the training process of the recognition model, and may determine abnormal data according to an absolute value of the loss after the training is completed. The data classifying unit 350 may set a normal condition for the loss function value and classify the data as abnormal or normal data depending on whether the loss function value satisfies the corresponding normal condition. The data classified by the data classifying unit 350 may form an abnormal training data candidate group and a normal training data candidate group.

The data updating unit 370 may update the first training data population by refining abnormal data in the first training data population and adding the second training data population. The data updating unit 370 may perform a refining operation for converting the abnormal training data candidate group classified by the data classifying unit 350 into normal data. The refining operation may be performed in various ways, and operations such as simple deletion, numerical calculation, and data modification may be applied singly or in combination. Then, the data updating unit 370 may update the existing training data population by adding the new second training data population to the existing first training data population. Before and after the update, the volume of the first training data population can increase and the quality of the training data can be improved.

In one embodiment, the data updating unit 370 may remove abnormal data from the first training data population or update the label of the abnormal data. The data updating unit 370 may replace a previous label that was misrecognized or assigned with low accuracy with a new label through a relabeling operation of adjusting labels of abnormal data. The relabeling operation performed by the data updating unit 370 may be implemented corresponding to an auto-labeling operation.

Meanwhile, the relabeling operation performed by the data updating unit 370 may be performed through manual label assignment by the user through the user terminal 110. That is, the data updating unit 370 transmits the abnormal data to the user terminal 110, and the user may directly input a new label after checking the abnormal data through the user terminal 110. The user terminal 110 may transmit the new label manually input by the user to the training database building device 130, and the new label may be transferred to the data updating unit 370 and processed as the relabeling operation.

Compared to the automatic relabeling operation by the data updating unit 370, the manual relabeling operation by the user may increase processing cost in that a person directly participates in the data checking and correction. However, as the performance of the machine learning model improves, the ratio of abnormal data existing in the existing training data decreases, so that the relabeling cost due to manual work can be reduced in proportion to the performance of the machine learning model.

The data augmenting unit 390 may increase the training data by repeatedly performing building of the recognition model, generation of the second training data population, and update of the first training data population. In the case of the newly updated first training data population to which the second training data population is added according to the repeated operations, it may be processed as existing training data in the next iteration. In addition, a series of operations of refining abnormal data in the existing training data and generating and adding new training data may be repeatedly performed under the control of the data augmenting unit 390. That is, the data augmentation unit 390 may control the repeated operations for augmenting the training data in association with each of the recognition model building unit 310, the auto-labeling unit 330, the data classifying unit 350, and the data update unit 370.

In one embodiment, the data augmenting unit 390 may dynamically control the number of iterations for data augmentation in consideration of the type of training data, the characteristics of the machine learning algorithm, and the size, time, and cost of data augmentation.

In one embodiment, the data augmenting unit 390 may perform data augmentation operations in parallel in a case where the training database building device 130 is implemented as a cloud server. Specifically, the data augmenting unit 390 may determine an instance configuration required for data augmentation, and may configure at least one instance in consideration of cloud-available resources. When the data augmentation operation is performed through a plurality of instances, the data augmenting unit 390 may generate a plurality of partial training data populations based on each of the first and second training data populations, and perform data augmentation operations through the respective instances in parallel.

Meanwhile, the training database building device 130 may operate in association with an independent cloud server, request some of the operations for data augmentation to the cloud server, receive a response thereto, and process the data augmentation operation.

The control unit (not shown in FIG. 3) may control the overall operation of the training database building device 130, and manage the control flow or data flow between the recognition model building unit 310, the auto-labeling unit 330, the data classifying unit 350, the data updating unit 370, and the data augmenting unit 390.

Figure 4:
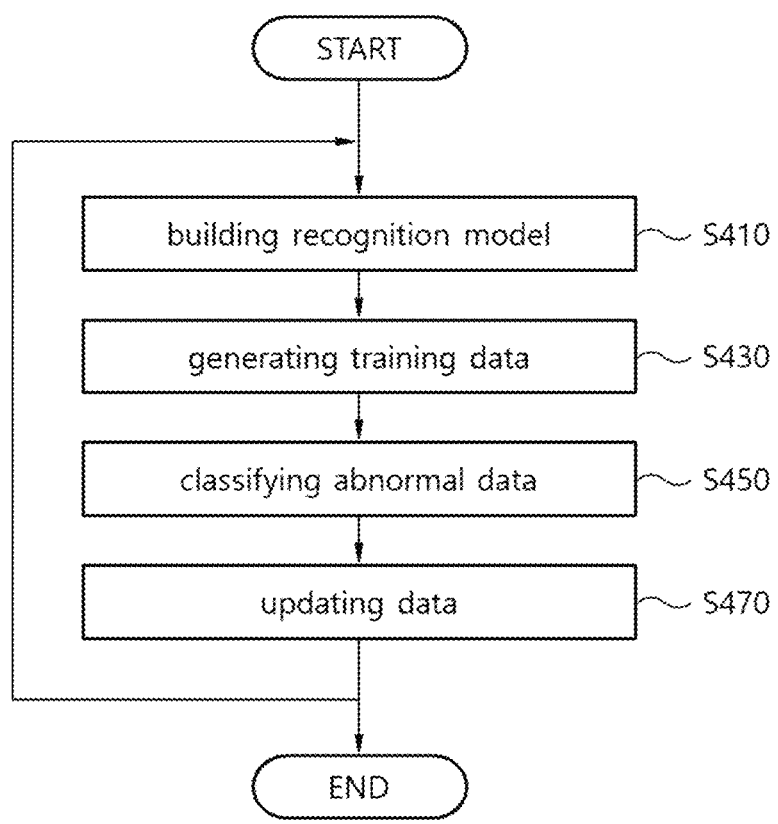
FIG. 4 is a flowchart illustrating a method for constructing a training database using automatic anomaly detection and automatic labeling technology according to the present disclosure.

FIG. 4 is a flowchart illustrating a method for building a training database using automatic anomaly detection and automatic labeling technology according to the present disclosure.

Referring to FIG. 4, the training database building device 130 may learn the labeled first training data population through the recognition model building unit 310 to independently build the first and second recognition models for data classification (Step S410). The training database building device 130 may generate the labeled second training data population by applying the first recognition model to an unlabeled raw data population through the auto-labeling unit 330 (Step S430).

Thereafter, the training database building device 130 may classify the abnormal data by applying the second recognition model to the first training data population through the data classifying unit 350 (Step S450). The training database building device 130 may update the first training data population by refining abnormal data in the first training data population through the data updating unit 370 and adding the second training data population (Step S470).

The training database building device 130 according to one embodiment of the present disclosure can increase the training data step by step by repeatedly performing building of the recognition model, generation of the second training data population, and update of the first training data population through the data augmenting unit 390, and when interworking with a cloud server, can more effectively process the operations for data augmentation by utilizing cloud resources.

Figure 5:
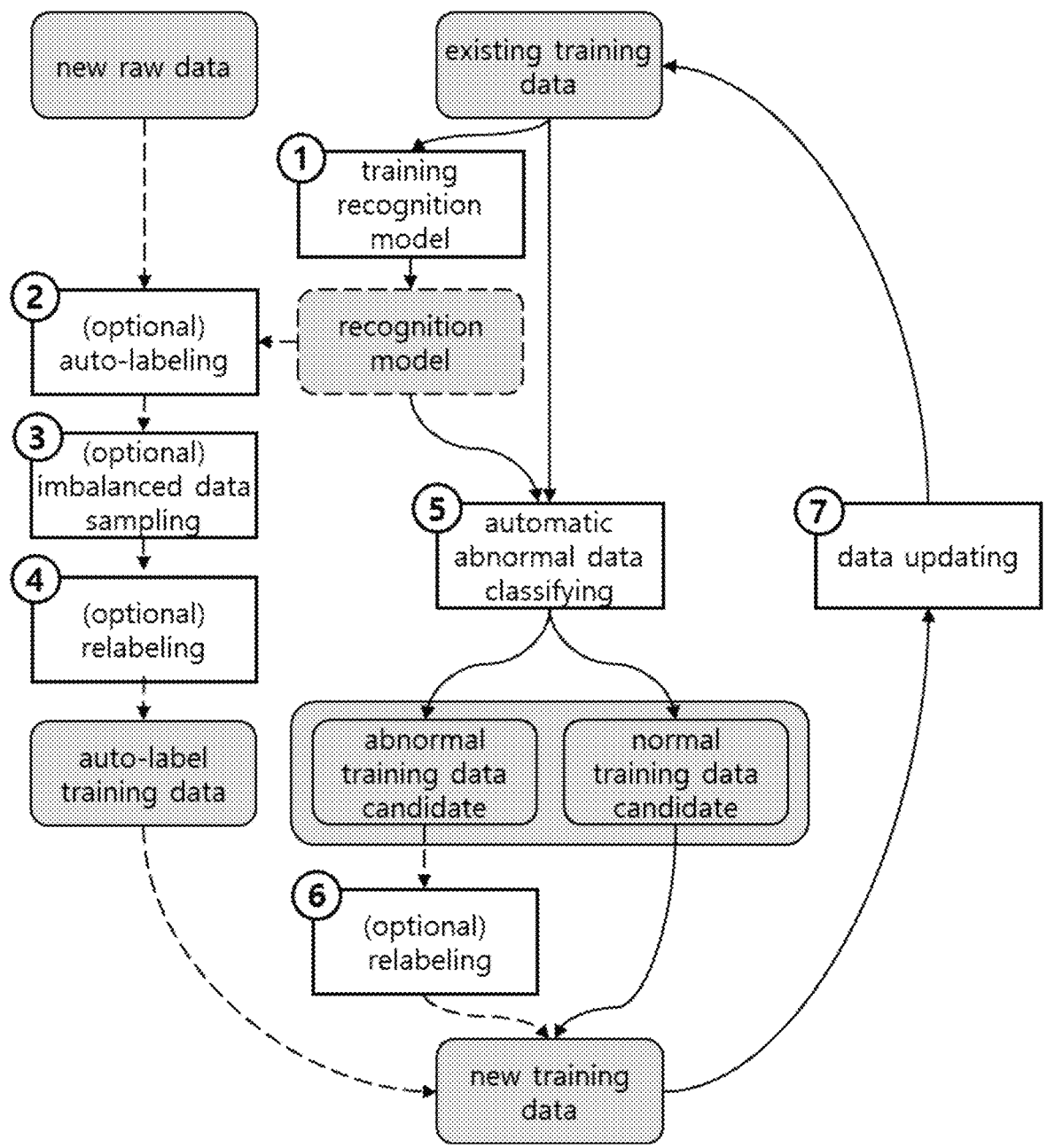
FIG. 5 is a conceptual diagram illustrating one embodiment of the training database building method according to the present disclosure.

FIG. 5 is a conceptual diagram illustrating one embodiment of the training database building method according to the present disclosure.

Referring to FIG. 5, the training database building device 130 can effectively secure training data of guaranteed quality through a series of repetitive operation steps. That is, the training database building device 130 can automatically generate training data used for machine learning by using a data processing technology using many parameters called Deep Learning or Deep Neural Network, and automatically determine the degree of abnormality in manual or automatically generated training data.

In FIG. 5, the training database building device 130 may learn the recognition model using the existing training data (Step 1). In this case, a single or multiple recognition models may be generated, and each may be used for the auto-labeling operation and the abnormal data classification operation. The training database building device 130 may perform the auto-labeling operation on new raw data based on the recognition model (Step 2), perform an imbalanced data sampling operation to compensate for imbalance in data distribution (Step 3), and generate auto-labeled training data by performing a relabeling operation to improve data quality (Step 4). The auto-labeling operation, the imbalanced data sampling operation, and the relabeling operation may be optionally applied as needed.

In addition, the training database building device 130 may classify abnormal data in the previously labeled training data based on the recognition model (Step 5), and perform the relabeling operation to refine the classified abnormal data (Step 6). The refined abnormal data and normal data may be integrated with the auto-labeled training data and used to update the existing training data (Step 7). The above operations (Steps 1 to 7) may be repeatedly performed by the training database building device 130, and the volume of training data for machine learning increases at each repetition.

FIGS. 6 to 9 are diagrams illustrating embodiments of the specific operations of FIG. 5.

Figure 6:
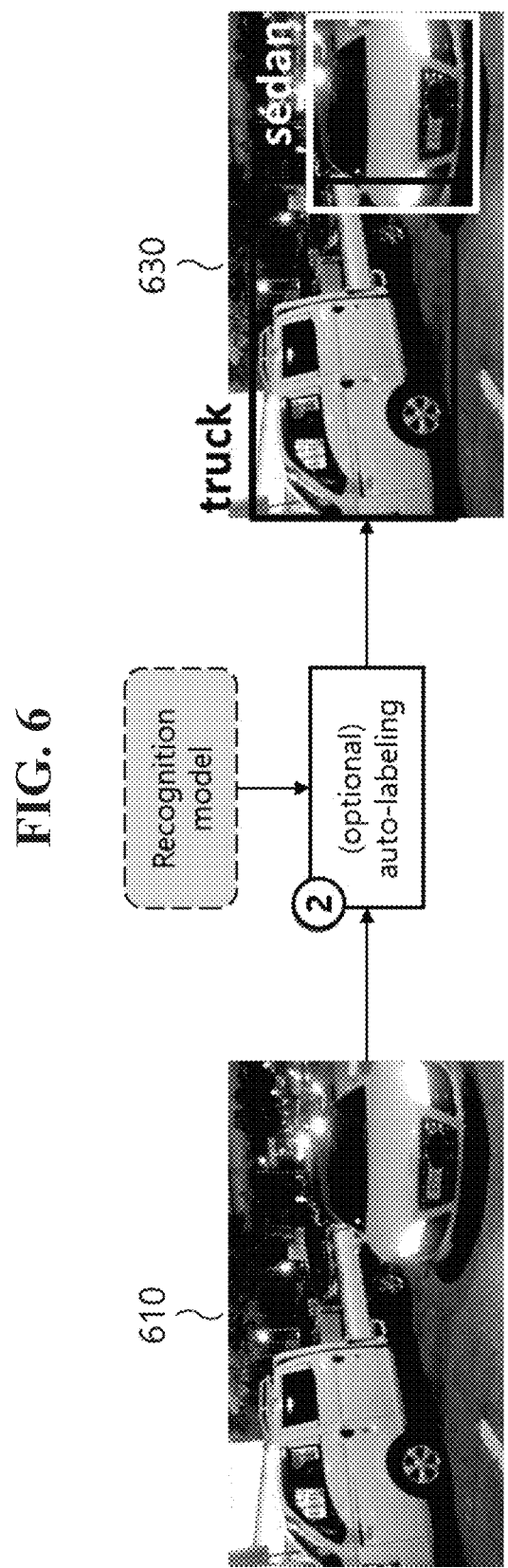
FIGS. 6 to 9 are diagrams illustrating embodiments of specific operations of FIG. 5.

Referring to FIG. 6, the training database building device 130 may generate auto-labeled data 630 having similar correct answer data from raw data 610 having no correct answer data through the auto-labeling operation to which the recognition model is applied. For example, when the raw data 610 corresponds to an image including an object, auto-labels for objects recognized on the corresponding image may be generated through auto-labeling.

Meanwhile, the auto-labeled data may include both misrecognized and unrecognized data depending on the recognition performance of the recognition model, and may have some differences from ideal data. However, automatic labeling may require significantly less time and human resources compared to manual labeling.

Figure 7:
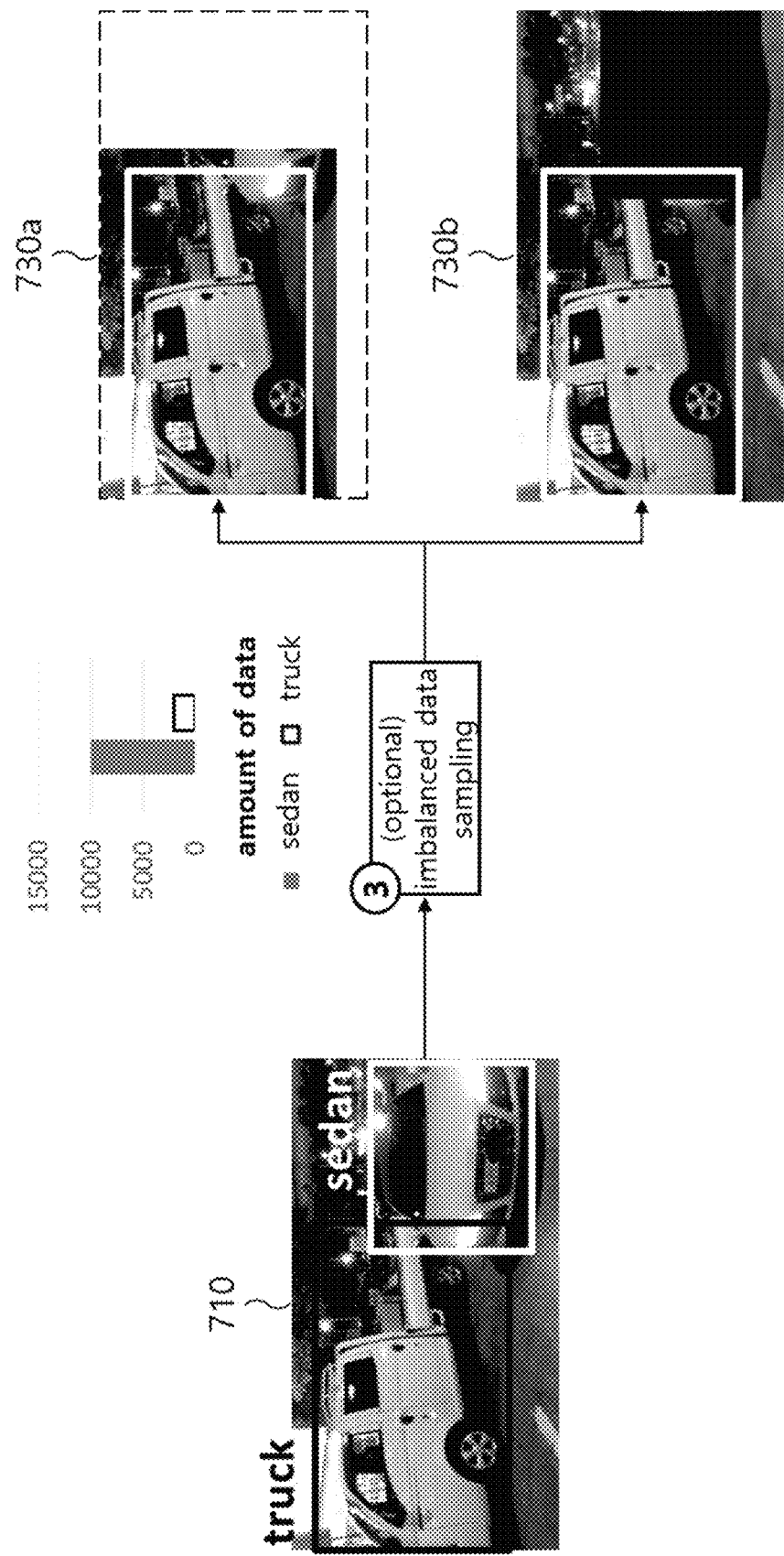

Referring to FIG. 7, the training database building device 130 may extract meaningful labeled data 730 from auto-labeled data 710 having similar correct answer data through the imbalanced data sampling operation. For example, in FIG. 7, when the distribution of the existing training data (in the case of images) corresponds to an imbalanced state in which data of sedan is very much compared to data of truck, the training database building device 130 may selectively extract only meaningful labeled data 730 through a method (case of 730*a*) of cropping only the selected label image and a method (case of 730*b*) of overlaying a predetermined image (or color) on an image of a non-selected label. Meanwhile, it goes without saying that various methods including the above examples may be applied to the sampling method.

Figure 8:
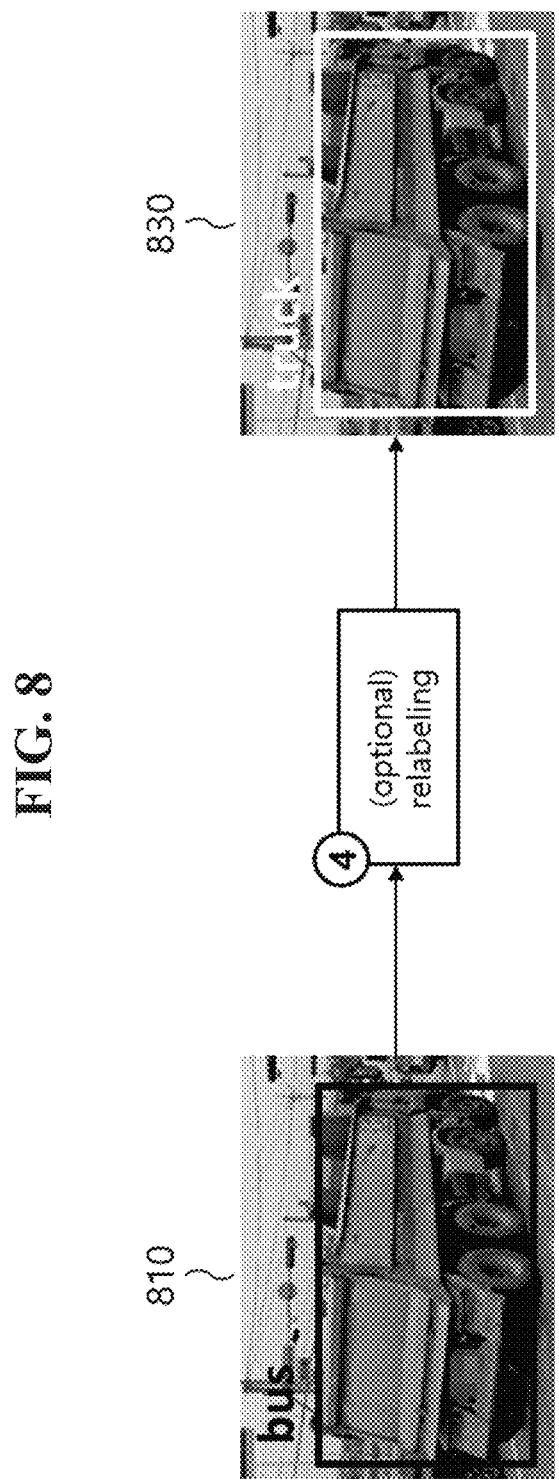

Referring to FIG. 8, the training database building device 130 may correct misrecognized labeled data 810 through the relabeling operation and update the data with corrected labeled data 830. Meanwhile, the relabeling operation may be manually processed as needed. That is, the training database building device 130 may transmit misrecognized labeled data 810 which needs to be relabeled to the user terminal 110 in association with the user terminal 110, and after checking the corresponding data on the user terminal 110, the user may directly input a normal label replacing the misrecognized label. Thereafter, the corrected labeled data 830 may be transmitted from the user terminal 110 to the training database building device 130.

As such, even when some processes of the method according to the present disclosure are manually processed, since abnormal data has already been effectively reduced through the auto-labeling and imbalanced data sampling, a large amount of training data can be effectively secured with a minimum amount of labor.

Figure 9:
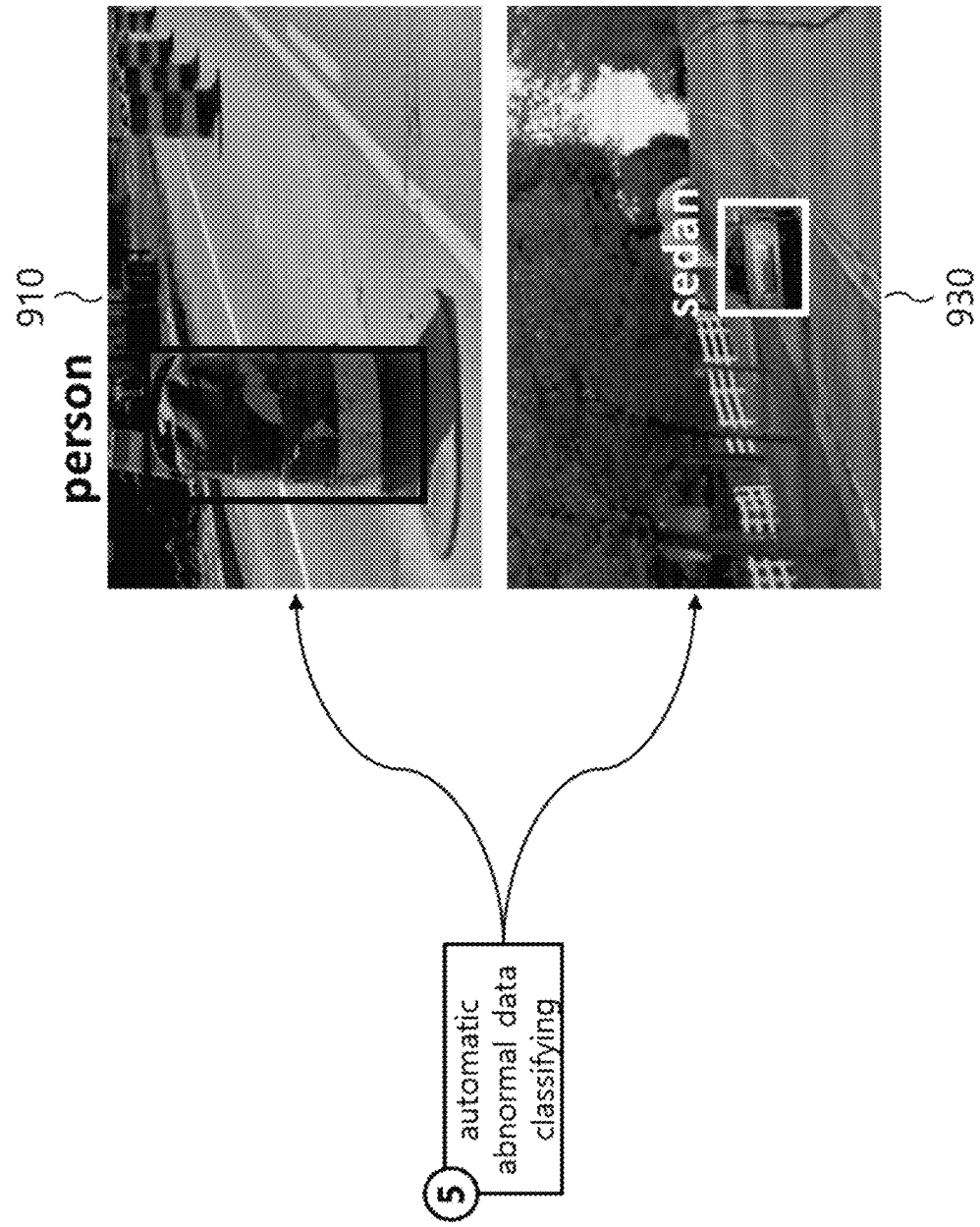

Referring to FIG. 9, the training database building device 130 can effectively classify normal data 910 and abnormal data 930 using the recognition model trained through existing training data. Through this, the training database building device 130 can additionally detect an erroneous label that exists despite the relabeling operation. In this case, the used method may include various methods, including a method of classifying based on variability of loss during training and a method of classifying based on an absolute value of loss after training is completed.

Although there has been described with reference to preferred embodiments of the present disclosure in the above, it should be understood that those skilled in the art may variously modify and change the present disclosure without departing from the idea and scope of the present disclosure described in the following claims.

[Description of Reference numerals]

| | |
|---|---|
| 100: training database building system | |
| 110: user terminal | 130: training database building device |
| 150: database | |
| 210: processor | 230: memory |
| 250: user input/output unit | 270: network input/output unit |
| 310: recognition model building unit | 330: auto-labeling unit |
| 350: data classifying unit | 370: data updating unit |
| 390: data augmenting unit | |

The invention claimed is:

1. A method for building a training database using automatic anomaly detection and automatic labeling technology, the method comprising:

independently building a first and a second recognition model for data classification by training a labeled first training data population;

generating a labeled second training data population by applying the first recognition model to an unlabeled raw data population;

classifying abnormal data by applying the second recognition model to the first training data population; and updating the first training data population by refining the abnormal data in the first training data population and adding the second training data population, wherein the generating of the second training data population includes sampling and updating imbalanced data of a first type of data in the second training data population based on data distribution of the first type of data in the first training data population.

2. The method of claim 1, wherein the building of the first recognition model and the second recognition model includes building the first recognition model and the second recognition model as one recognition model.

3. The method of claim 1, wherein the generating of the second training data population includes sampling and updating imbalanced data of the first type of data in the second training data population at a first rate based on data distribution of the first type of data in the first training data population being a first distribution ratio, and sampling and updating imbalanced data of the first type of data in the second training data population at a second rate lower than the first rate based on data distribution of the first type of data in the first training data population being a second distribution ratio higher than the first distribution ratio.

4. The method of claim 3, wherein the generating of the second training data population includes classifying abnormal data and updating labels of the abnormal data by applying the second recognition model to the second training data population.

5. The method of claim 1, wherein the classifying of the abnormal data includes determining the abnormal data based on loss of the second recognition model.

6. The method of claim 1, wherein the updating of the first training data population includes removing the abnormal data from the first training data population or updating a label of the abnormal data.

7. The method of claim 1, further comprising increasing training data by repeatedly performing the building of the first recognition model and the second recognition model, the generation of the second training data population, and the updating of the first training data population.

8. A system for building a training database using automatic anomaly detection and automatic labeling technology, the system comprising:

a recognition model building unit configured to independently build a first and a second recognition model for data classification by training a labeled first training data population;

an auto-labeling unit configured to generate a labeled second training data population by applying the first recognition model to an unlabeled raw data population;

a data classifying unit configured to classify abnormal data by applying the second recognition model to the first training data population; and a data updating unit configured to update the first training data population by refining the abnormal data in the first training data population and adding the second training data population, wherein the generating of the second training data population includes sampling and updating imbalanced data of a first type of data in the second training data population based on data distribution of the first type of data in the first training data population, and wherein the recognition model building unit, the auto-labeling unit, the data classifying unit, and the data updating unit are each implemented via at least one processor.

* * * * *